Sept. 11, 1951  R. AMSLER  2,567,755
TEMPERATURE RESPONSIVE SYSTEM
Filed April 28, 1944

INVENTOR
ROBERT AMSLER
BY
Morgan, Finnegan & Durham
ATTORNEYS

Patented Sept. 11, 1951

2,567,755

UNITED STATES PATENT OFFICE 2,567,755

TEMPERATURE RESPONSIVE SYSTEM

Robert Amsler, Zug, Switzerland, assignor to Landis & Gyr A. G., a corporate body of Switzerland Application April 28, 1944, Serial No. 533,122
In Switzerland May 17, 1943

6 Claims. (Cl. 73—362)

1

The invention refers to temperature regulators which use a temperature dependent resistance as a sensitive member. Sensitive members of this nature are termed resistance thermometers and are useful for controlling a suitable operating instrument either in bridge connection or directly as a series resistance. As operating instruments, may be mentioned either contact galvanometers, differential relays or Ferraris contact watt-meters.

With the known embodiments of such temperature regulators, extraordinarily sensitive regulating instruments are necessary since the metals used in practice for the resistance thermometers have only comparatively small temperature coefficients and thus the resistances of the resistance thermometers only vary within narrow limits.

The present invention comprises an electric temperature regulator comprising an operating instrument having one or more coils and serving to control heating means whereby the temperature of a system is regulated, one of said coils being connected in series with a temperature feeler comprising at least one temperature-sensitive resistance, at least one additional temperature-sensitive resistance being connected in the circuit of said coil, the response of said additional temperature-sensitive resistance to variations in current through said temperature feeler being such as to increase the magnitude of said variations in the said coil of the operating instrument.

The accompanying drawings show diagrammatically by way of example several embodiments of the invention, in which.

The following description refers to the use as operating or responding instrument of a differential relay or a galvanometer, but a Ferraris contact watt-meter may be equally well used.

Figure 1:
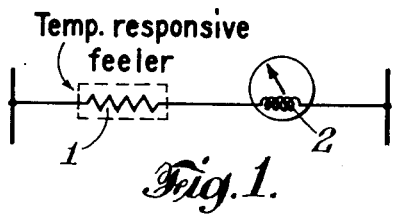
Figure 1 shows the connection of a resistance thermometer hitherto usual whilst
Figure 3:
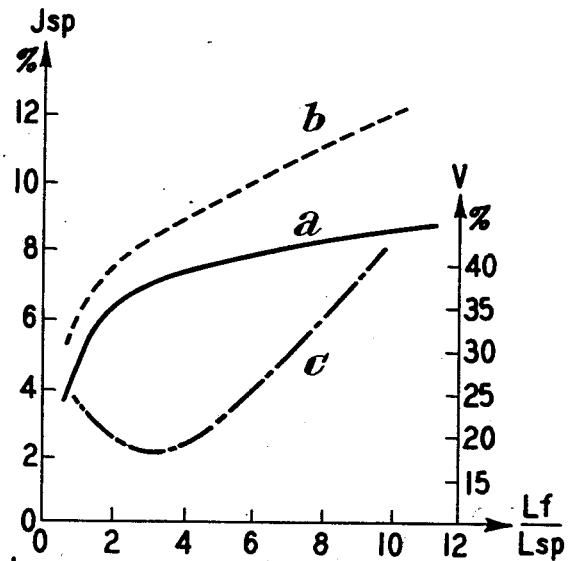
Figure 3 represents by means of graphs the improvement attainable by the invention.

In Figure 1 there is shown in principle the usual arrangement of the temperature sensitive member or feeler 1 in series with the coil 2 of the operating or responding instrument, hereinafter referred to as the operating instrument. Any variation of temperature at the sensitive member 1 effects a change of its resistance and consequently a variation of the current. The variation of current obtained at the sensitive member or feeler 1 for a particular temperature variation is all the greater, the greater the ratio of the feeler resistance to the coil resistance of the operating instrument. As the feeler resistance there can be employed any material having as large a temperature coefficient as possible which is positive, as for example with metals, or negative as for example with carbon or electronic semiconductors. In Figure 3 the graph $a$ represents the percentage increase of the current $J_{sp}$ for an increase of the feeler resistance by 10% as a function of the ratio of the energy $L_f$ consumed in the feeler resistance to the energy $L_{sp}$ consumed in the coil of the operating instrument.

Figure 2:
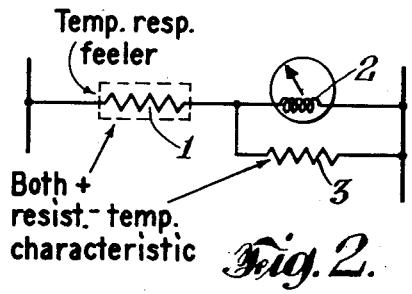
Figure 2 and Figures 4 to 6 show resistance thermometers with thermal amplification.

The principle of the thermal amplifier is shown in Figure 2. It consists in a temperature-dependent resistance 3, e. g. a metal filament incandescent lamp connected in parallel with the coil 2 of the operating instrument. The method of operation of this arrangement is as follows: If the resistance of the feeler 1 increases, the current falls in the coil 2 and in the lamp 3. Consequently the temperature of the incandescent filament falls and with it the resistance of the incandescent filament, so that now the current flowing through the temperature feeler 1 is differently distributed, more flowing through the temperature-dependent resistance 3 and less through the coil 2 of the operating instrument. Thus, therefore, the original variation of current in the coil 2 of the operating instrument is amplified. In consequence of the variation in resistance of the lamp 3, a greater total current then flows than when the resistance remains constant, which again has as a result that the drop in potential at the temperature feeler is greater and thus the coil current is again reduced.

By connecting in the temperature-dependent resistance 3, however, the energy consumed in the temperature feeler 1 is increased. If the arrangement is to present any advantage, the relative amplification must be greater than the effect which would be attained with like energy consumption in the feeler without thermal amplification. A comparison of the two arrangements has thus to take place based on a like ratio of the energy consumption in the feeler to the energy consumption in the coil.

In Figure 3, the graph $b$ shows such a comparison, using a metal filament incandescent lamp as the thermal amplifier, with a filament temperature of the order of 500° C. and a ratio of $$\frac{1}{1}$$

between coil resistance and lamp resistance. The course of this curve during which an increase of 10% is to be assumed in the feeler resistance, shows that, as the ratio of feeler output to coil output increases, the percentage change of the current $J_{sp}$ increases rapidly to high magnitudes. The improvement $$V = \frac{J_{sp} \text{ (Curve } b)}{J_{sp} \text{ (Curve } a)} - 1$$

obtained by means of the thermal amplifier, is represented in Figure 3 by the curve c, which expresses the resulting amplification V in percentage terms, on the right-hand scale. From this it is evident that, in the present example, an amplification of at least 18% is obtained.

A similar amplification effect may be attained if a temperature-dependent resistance having a negative temperature coefficient is connected in series with the temperature feeler, and coil of the operating instrument. Since the amplifier operates in air and is cooled by the air, its temperature variation may be comparatively great for a particular current variation, whereby its resistance also varies greatly and a considerable amplification effect is attained.

The thermal amplification arrangement described has the further disadvantage of dependence on temperature, since it is exposed to the variable temperature of the surroundings. This could be obviated by mounting the amplifier in a housing of constant temperature. Much simpler than this, however, is the use of a second similar amplifier in the circuit of the second coil of the differential relay. The two amplifiers then operate in opposition to each other and the dependence on temperature is thereby nullified. The arrangement above described has, however, a further advantage. It is known that in any temperature regulator, of which a high degree of accuracy is required, a resetting or calibrating device is necessary. This effects a temporary displacement of the regulated or standard value to which the device has been set, which displacement disappears again after a correction has been made of the regulated temperature. A resetting device can be introduced into the above described arrangement in a very simple manner. If the resistance acting as the thermal amplifier be heated by separate heating winding there results a variation of the coil current which is equivalent to a displacement of the regulated or standard value. If the heating is cut off, then this displacement disappears again. It is therefore only necessary for this heating winding to be switched in and out each time by a contactor worked by the operating instrument in order to obtain the desired resetting. The operating instrument is thus brought back prematurely by the displacement of the regulated or standard value due to the heating of the thermal amplifier, and switches its contactor out, before this would take place by the temperature variation of the medium regulated. There is obtained in this way a rigid resetting for an "Open/Closed" regulator and an elastic one for a progressive regulator. The magnitude of the resetting is given by the heat capacity of the thermal amplifier and the period of resetting by the time of cooling thereof. These factors can be varied so that the regulator can be adapted to any purpose.

Figure 4:
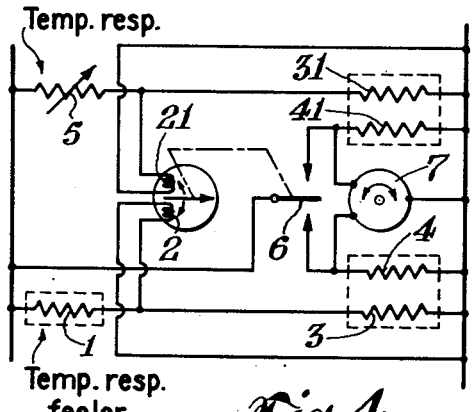

Figure 4 represents an arrangement according to the invention, in which 1 is the temperature feeler having a positive temperature coefficient which is in series with the coil 2 of the operating instrument. In parallel with the coil 2 is the temperature-dependent resistance 3 referred to as the thermal amplifier and having a positive temperature coefficient. The resistance 3 can be heated by the heating winding 4 acting as resetting device, which can be placed on potential through a contactor 6 worked by the operating instrument. The second coil 21 of the operating instrument is in series with an adjustable resistance 5 serving for adjusting the desired regulated or standard temperature and in parallel with the thermal amplifier 31 which, on its part, can be heated by the heating winding 41 that is also placed on potential by the contactor 6. Furthermore, a regulating member 7 for controlling a heating system for example can be actuated in the desired direction by the contactor 6 worked by the operating instrument.

Figure 5:
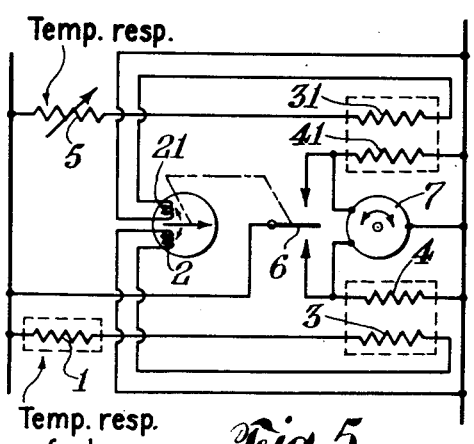

In Figure 5 there is shown a similar arrangement to that in Figure 4, but with the difference that the thermal amplifiers 3 and 31 have a negative temperature coefficient.

Figure 6:
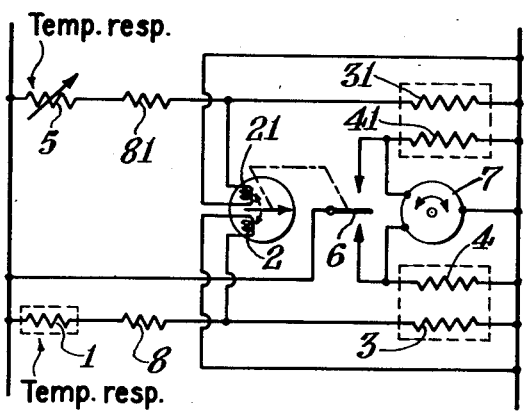

Figure 6 also shows an arrangement like that of Figure 4 but the thermal amplifiers 3 and 31 have positive and the thermal amplifiers 8 and 81 negative temperature coefficients. The method of operation of these arrangements is easily understandable from the description of the method of working of the fundamental arrangement according to Figure 2.

The regulating arrangement above described has various possibilities of use. Thus for example, a temperature can be kept constant, either by off/on regulation with rigid resetting or by progressive regulation with elastic resetting. On the other hand, a regulated temperature can be shifted thereby in accordance with a second temperature, a second temperature feeler being introduced instead of the adjusting resistance 5.

What is claimed is:

1. A temperature responsive system comprising a temperature responsive feeler resistor exposed to a temperature to be measured or controlled and a current responsive device having an operating coil, said coil and feeler resistor being connected in series across a substantially constant source of potential, said device having an element movable in response to coil current, one additional temperature responsive resistor connected across said coil, said two resistors having positive temperature-resistance coefficients, said feeler resistor being the only resistor subject to temperature to be measured or controlled with the additional resistor not being subject to the temperature being measured or controlled whereby when said feeler resistor changes its resistance in response to a temperature change, the distribution of currents through the additional resistor and coil are varied in an amplified manner and the movable element has a greater movement for a predetermined feeler temperature change in said system than in a system not having the additional resistor.

2. The system according to claim 1 wherein the additional resistor has a value of resistance of the order of the resistance of the coil.

3. The system according to claim 1 wherein the resistance of the feeler resistor is substantially larger than the resistance of the shunt connected coil and additional resistor with the additional resistor having a resistance of the same order of the resistance of the coil.

4. A temperature responsive system comprising a temperature feeler resistor exposed to a temperature to be measured or regulated and a current responsive device having an operating coil in series across a substantially constant source of potential; said device having an element movable in response to coil current, one additional temperature responsive resistor connected across said coil, said two resistors having positive temperature-resistance coefficients, said feeler resistor being the only resistor subject to temperature to be measured or regulated with the additional resistor not being subject to the temperature being measured or regulated, a heating coil for said additional resistor, switching means controlled by the movement of said element for disposing said heating coil in a circuit for energizing the same, said heating coil acting upon said shunt resistor and providing a calibrated standard temperature for said shunt resistor, said feeler and shunt resistor serving to change the current through said coil in an amplified manner.

5. A temperature responsive system for regulating temperature comprising a temperature responsive feeler resistor exposed to the temperature to be regulated, a differential current responsive device having at least two operating coils and an element movable in response to coil currents, a first circuit having connections disposing said feeler resistor and one coil in series across a substantially constant potential source, an additional temperature responsive resistor connected across said one coil, said two resistors having positive temperature-resistance coefficients, said feeler resistor being the only resistor subject to temperature to be controlled with the additional resistor not being subject to the temperature being controlled, a second circuit connected across said potential source, said second circuit comprising one temperature responsive resistor in series with the second coil across said potential source, said second circuit also having an additional temperature resistor in shunt across said second coil, said two temperature responsive resistors in said second circuit having positive temperature-resistance coefficients, a heating coil for the shunt resistor in the first circuit, a second heating coil for the shunt resistor in the second circuit, switching means controlled by the movement of the movable element of said differential device for disposing one or other heating coil in an energizing circuit, the first resistor in the second circuit having a predetermined value and being free of the influence of the temperature to be regulated, said heating coils serving to provide calibrated reference temperatures for the shunt resistors, the distribution of current in the coil and shunt resistor of the first circuit varying in an amplified manner due to a variation in feeler resistance.

6. The system according to claim 5 wherein the switching means cooperates with the heating coils so that the movable member oscillates back and forth to alternately energize the heating coils and maintain the entire system in a state of operational oscillation.

ROBERT AMSLER.

REFERENCES CITED

The following references are of record in the file of this patent:

UNITED STATES PATENTS

| Number | Name | Date |
|---|---|---|
| 778,714 | Schweitzer | Dec. 27, 1904 |
| 1,193,076 | Schon | Aug. 1, 1916 |
| 1,411,311 | Sullivan | Apr. 4, 1922 |
| 1,763,175 | Nutzelberger | June 10, 1930 |
| 2,175,890 | Glowatzki | Oct. 10, 1939 |
| 2,208,562 | Locke | July 23, 1940 |
| 2,341,013 | Black | Feb. 8, 1944 |
| 2,356,269 | Potter | Aug. 22, 1944 |
| 2,517,628 | Bottoms | Aug. 8, 1950 |

FOREIGN PATENTS

| Number | Country | Date |
|---|---|---|
| 680,636 | France | May 2, 1930 |